Feb. 13, 1951 C. G. HAHN 2,541,758
GAUGE FOR CHECKING BEARING JOURNALS
Filed Aug. 25, 1948 2 Sheets-Sheet 1
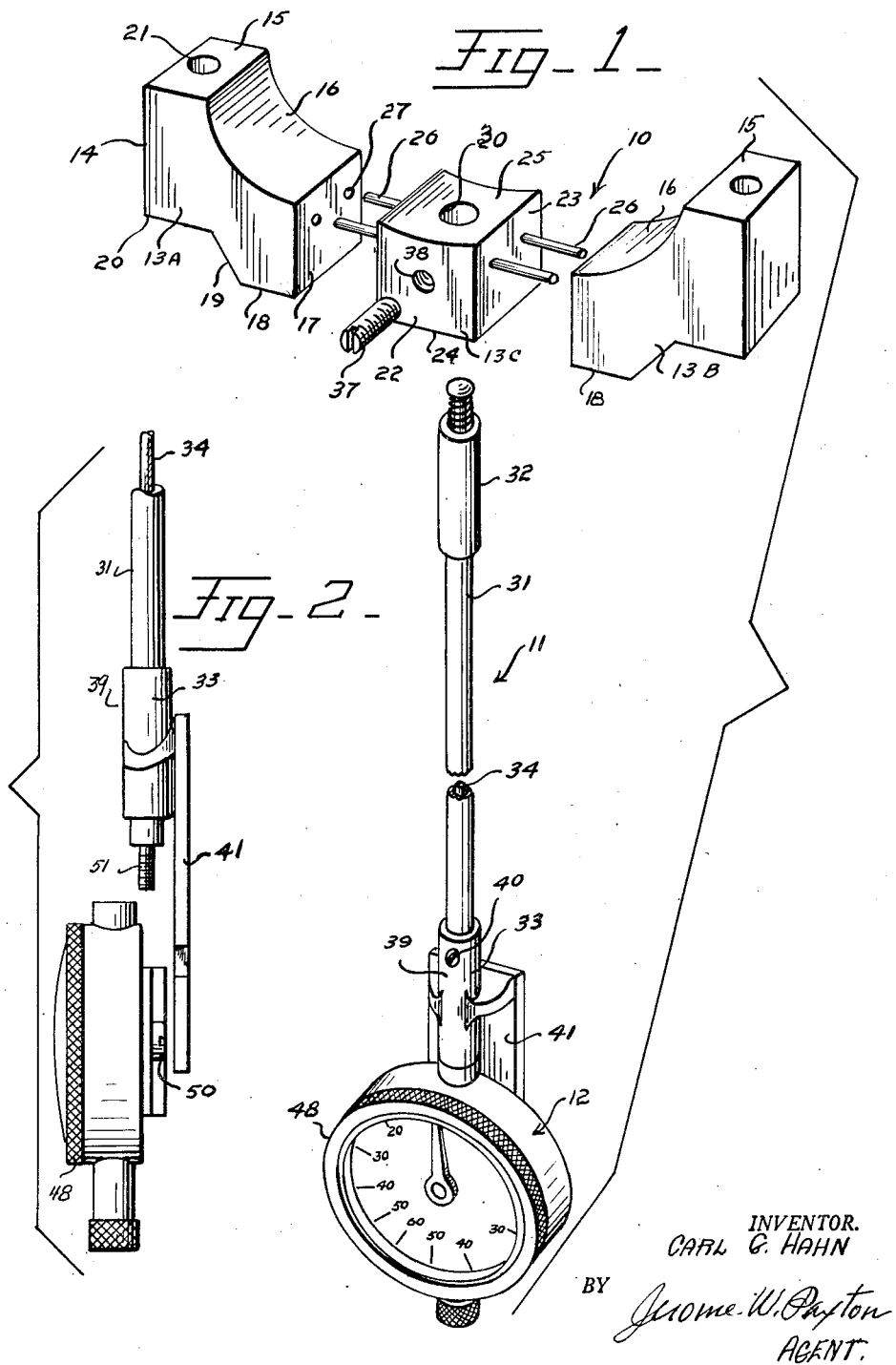
INVENTOR.
CARL G. HAHN
BY Jerome W. Payton
AGENT.

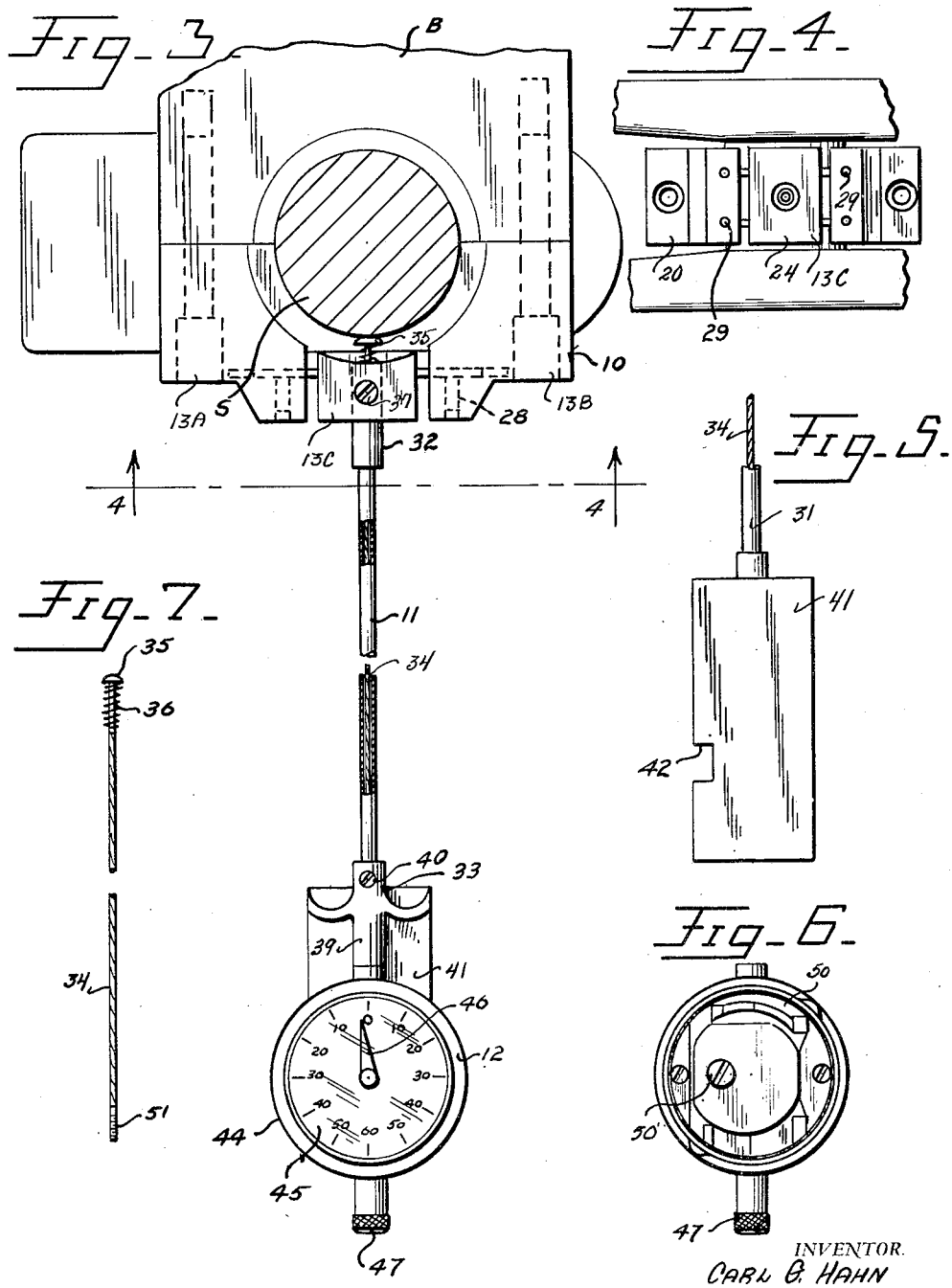

Patented Feb. 13, 1951

2,541,758

UNITED STATES PATENT OFFICE 2,541,758

GAUGE FOR CHECKING BEARING JOURNALS

Carl G. Hahn, Coshocton, Ohio

Application August 25, 1948, Serial No. 46,118

4 Claims. (Cl. 33—172)

In general the present invention relates to gauges for checking machine elements and in its more specific aspect has reference to a gauge for checking the main bearing crank shafts of engines without the necessity of removing the engine and shaft.

It is, of course, well known that in automobile repair shops and garages that the crank shaft of the engine must be in good condition when the engine is overhauled or else the engine will not be rebuilt in a satisfactory manner. The journals of the crank shaft must be true in diameter or the new bearings installed will not be fully efficient. It is no serious problem to check the connecting rod journals, since access to these journals may be readily had, and hence, a set of micrometers may be employed for accurate checking purposes. On the other hand, the main bearing journals are a different proposition and micrometers are not feasible for investigating the trueness of such journals. The top or upper half of the journal fits in the bearing which remains in the engine block and a bearing cap fits approximately the lower half of the journal, and when the cap is removed, it is manifest that some efficient means must be provided to check the trueness in diameter of the remaining bearing journal. Accordingly, it is an object of the present invention to provide a gauge which will check the main bearing journal of all types of motors without the necessity of removing the motor from the chassis or the crank shaft from the motor block.

Another object of my invention is to provide a gauge for main bearing crank shafts wherein the means for supporting the gauge on the motor block is readily adjustable to permit its installation on all types of motor blocks.

Yet another object of my invention is to provide a gauge of the character described which is relatively simple in structural detail, positive and efficient in operation and capable of being cheaply and readily manufactured.

To accomplish the above and other objects, the invention broadly comprises an adjustable bearing cap adapted to be removably attached to the engine block to form, in effect, the lower half of the main bearing journal, a spring-pressed feeler member operatively associated with the bearing cap in such a manner that the feeler member can contact the shaft, and associating an indicating dial with the feeler member so that the dial will indicate the condition of the main bearing journal.

With the gauge properly mounted with respect to the engine block, the motor is rotated by turning the fly wheel manually and zero the indicating hand of the dial to the lowest point. The motor is again turned slowly and a reading is taken of the highest point and this latter reading will be the correct out of round of the main bearing shaft.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 is a view in perspective of the elements constituting my gauge assembly, the feeler shaft assembly being partly broken away.

Figure 2 is a view in side elevation, partly broken away, of the lower end of the feeler shaft assembly depicting the mounting bracket for the dial, the dial not being mounted upon the bracket.

Figure 3 is a front elevational view, partly in section, showing the gauge in operative position on the motor block.

Figure 4 is a sectional view taken along the line 4—4 of Figure 3, looking in the direction of the arrows.

Figure 5 is a rear elevational view of the bracket which forms a part of the feeler shaft assembly.

Figure 6 is a rear view of the indicating dial.

Figure 7 is an elevational view of the feeler element of the feeler shaft assembly.

Referring to the drawings, and more particularly Figure 1, I have shown a universal bearing cap structure 10, a feeler shaft assembly 11, and an indicating dial 12. When the device is assembled, the feeler shaft assembly is supported by the bearing cap 10 at one end and the indicating dial is carried by the opposite end of the feeler shaft assembly.

The bearing cap assembly 10 comprises outer segments 13A, 13B and an intermediate segment 13C. In view of the fact that the segments 13A and 13B are identical in structure, the ensuing description will be limited to the segment 13A for the purpose of simplicity. This segment comprises an outer vertical wall 14 and an upper horizontal wall 15. The wall 15 merges with an inner arcuate face 16, and an inner vertical wall 17 extends from the arcuate face 16 to a lower horizontal face 18. An inclined surface 19 extends from the face 18 to the lower horizontal wall 20. An aperture 21 extends through the body of the segment 13A from the wall 15 to the wall 20 and, as will hereinafter be more fully described, a bolt is adapted to extend through the aperture for mounting the bearing cap 10 to the engine block.

The intermediate segment 13C has flat end walls 22, side walls 23 and a lower wall 24. The upper wall or face of the segment 13C is arcuate, as shown at 25. A pair of spaced apart pins 26 extend outwardly from the segment 13C from the side walls 23 and may be anchored to the segment in any desirable manner. The pins 26 are adapted to extend into alined bores 27 formed in the wall 17 of the segments 13A and 13B, respectively, in order that the length of the cap may be adjusted to adapt the cap to the particular engine block. This is accomplished by moving the segments 13A and 13B either closer to or farther apart from the segment 13C. Assuming that the segments 13A and 13B have been properly located with respect to the segment 13C, it will be noted that the horizontal face 18 of the segments 13A and 13B is formed with a pair of spaced threaded openings 28, and the inner end of each opening will be in communication with the pin 26. A screw 29 is disposed in each of the openings, and upon rotation of the screws to the desired point, they will contact the pins 26 and thus hold the segments 13A, 13B and 13C in proper relation.

With reference to Figures 1 and 3, it will be seen that the segment 13C is formed with a circular opening 30 which extends from the arcuate face 25 to the flat lower face 24. The purpose of the opening 30 is to form an anchoring point for the feeler shaft assembly 11 to the universal bearing cap 10, as will now be more fully described. The feeler shaft assembly includes a hollow tube 31 supporting a bearing sleeve 32 at the upper end thereof and a bracket 33 at the lower end. A flexible shaft 34 extends longitudinally of the tube 31 and terminates in an operating head 35 at its upper extremity. A helical spring 36 surrounds the flexible shaft 34 and one end bears against the head 35 while the opposite end bears against the upper end of the sleeve 32. The sleeve 32 is of such diameter as to fit within the opening 30 and when properly located therein, a screw 37 is threaded into aperture 38 in end wall 22 of the segment 13C until it engages the sleeve 32 and thereby maintains it in secure position in the segment 13C.

The bracket 33 embodies a sleeve 39 which may be attached to the tube 31 by means of a screw 40. Integrally formed with the sleeve 39 is a rectangular plate element 41 which is slotted adjacent its lower end, as shown at 42, and the plate 41 serves to support the indicating dial 12.

The indicating dial 12 may be of any desirable construction and includes a casing 44, dial 45, indicating finger 46 and an operating member 47 which may impart rotary movement to the finger 46. The dial 45 is of the type wherein the graduations enable readings to one-thousandths of an inch and the dial face may be rotated by manipulation of a ring 48 rotatably mounted on the casing 44. The rear of the dial is provided with a rail 50 which receives the slot 42 and the dial is secured to the plate 41 by a screw 50'.

To attach the feeler shaft assembly 11 to the indicating dial 12, it can be seen that the lower end of the flexible shaft 34 is threaded, as shown at 51, and the shaft 34 is inserted into the upper end of the casing so that the threads 51 will engage the threaded opening of the dial 12. The gauge is now ready for use, and the sleeve 32 on the tube 31 is now inserted in the aperture 30 of the segment 13C and the feeler shaft is moved until the head 35 engages the crank shaft S and the screw 37 is then rotated to lock the sleeve in the segment 13C. The fly wheel is then turned by hand, thus rotating the motor slowly and the dial hand 46 is zeroed to the lowest point. The motor is again turned slowly and a reading is taken at the highest point and this latter reading will be the correct out of round reading of the main bearing journal.

It will be appreciated, therefore, that the gauge assembly is simple in structural detail, very easy to operate and can be used by inexperienced workmen.

By virtue of the adjustable cap, the gauge may be attached to all types of motor blocks and readily secured to and removed from the motor block by manipulation of the bolts which extend through the apertures 21 in the segments 13A and 13B and into the apertures in the bearing block B of the motor.

I claim:

1. A gauge for checking the main bearing journal of motors comprising a supporting cap adapted to be attached to the motor block, said cap including a pair of spaced apart outer segments and an intermediate segment, a pair of pins extending outwardly from each side of said intermediate segment, each of said outer segments being provided with openings to receive said pins, means to secure the pins in said openings, additional means carried by each of the outer segments to attach said segments to the motor block, said intermediate segment having a vertical bore extending therethrough, a feeler shaft assembly projecting through the bore and engaging the crank shaft, means to anchor the feeler shaft assembly to the intermediate segment, spring means maintaining said feeler shaft assembly in engagement with the crank shaft, and an indicating dial operatively connected to said feeler shaft assembly so that on rotation of the crank shaft the out of round condition of the crank shaft will be indicated on the dial.

2. A gauge for checking the main bearing journal of motors comprising a supporting cap adapted to be attached to the motor block, said cap including a pair of spaced apart outer segments and an intermediate segment, a pair of pins extending outwardly from each side of said intermediate segment, each of said outer segments being provided with openings to receive said pins, means to secure the pins in said openings, additional means carried by each of the outer segments to attach said segments to the motor block, said intermediate segment having a vertical bore extending therethrough, an elongated tubular member anchored in the bore, a flexible shaft disposed within and extending longitudinally of the tubular member, a head carried by the upper end of the shaft and adapted to engage the crank shaft, spring means maintaining said head in engagement with the crank shaft, a bracket supported by the lower end of the tubular member, an indicating dial mounted on the bracket, and a connection between the flexible shaft and the dial so that on rotation of the crank shaft the out of round condition of the crank shaft will be indicated on the dial.

3. A gauge for checking the main bearing journal of motors comprising a supporting cap including a pair of spaced apart outer segments and an intermediate segment, means to secure the intermediate segment to the outer segments, additional means carried by each of said outer segments to attach said segments to the motor block, said intermediate segment being provided with a vertical bore extending therethrough, a feeler shaft assembly projecting through the bore and engaging the crank shaft, means to anchor the feeler shaft assembly to said intermediate segment, spring means maintaining the feeler shaft assembly in engagement with the crank shaft, and an indicating dial operatively connected to the feeler shaft assembly so that on rotation of the crank shaft the out of round condition of the crank shaft will be indicated on the dial.

4. A gauge as claimed in claim 3 wherein said outer segments are adjustably secured to said intermediate segment to adapt the cap to the particular engine block.

CARL G. HAHN.

REFERENCES CITED

The following references are of record in the file of this patent:

UNITED STATES PATENTS

| Number | Name | Date |
| --- | --- | --- |
| 1,133,462 | Edwards | Mar. 30, 1915 |
| 1,303,387 | Pogue | May 13, 1919 |
| 1,656,302 | Swaney | Jan. 17, 1928 |
| 2,306,489 | Mortensen | Dec. 29, 1942 |
| 2,467,847 | Mozur | Apr. 19, 1949 |